H. HANSEN & J. A. MONTGOMERY.
DIFFERENTIAL TRANSMISSION.
APPLICATION FILED MAR. 16, 1917.

1,257,225.

Patented Feb. 19, 1918.
3 SHEETS-SHEET 1.

WITNESSES

INVENTORS
H. Hansen
J. A. Montgomery
BY
ATTORNEYS

H. HANSEN & J. A. MONTGOMERY.
DIFFERENTIAL TRANSMISSION.
APPLICATION FILED MAR. 16, 1917.
1,257,225.
Patented Feb. 19, 1918.
3 SHEETS—SHEET 2.
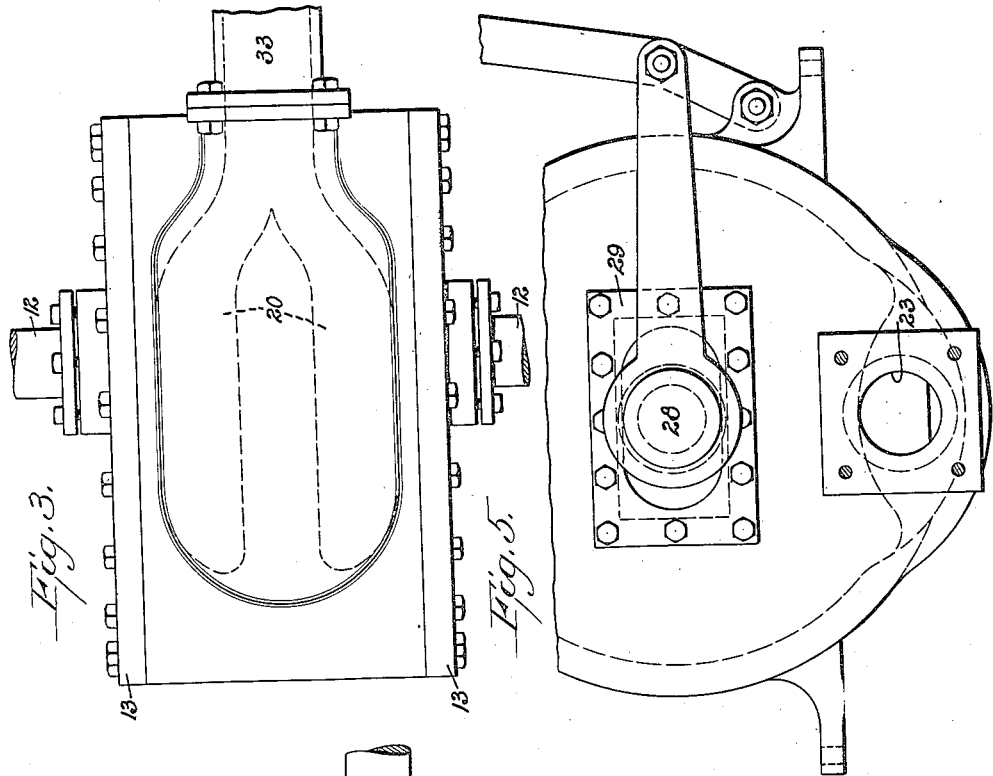
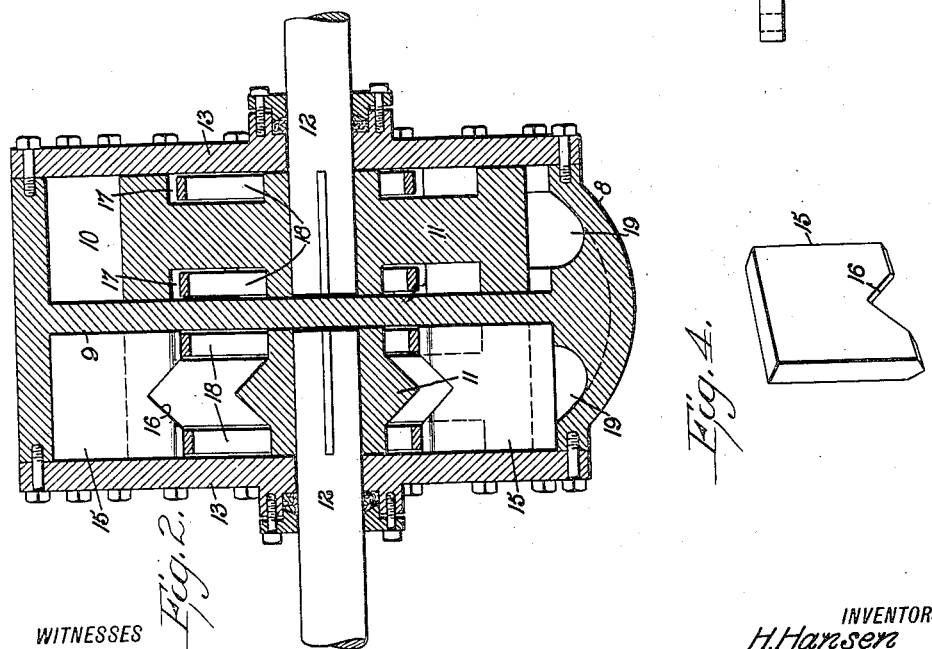
WITNESSES
INVENTORS
H. Hansen
J. A. Montgomery
BY
ATTORNEYS

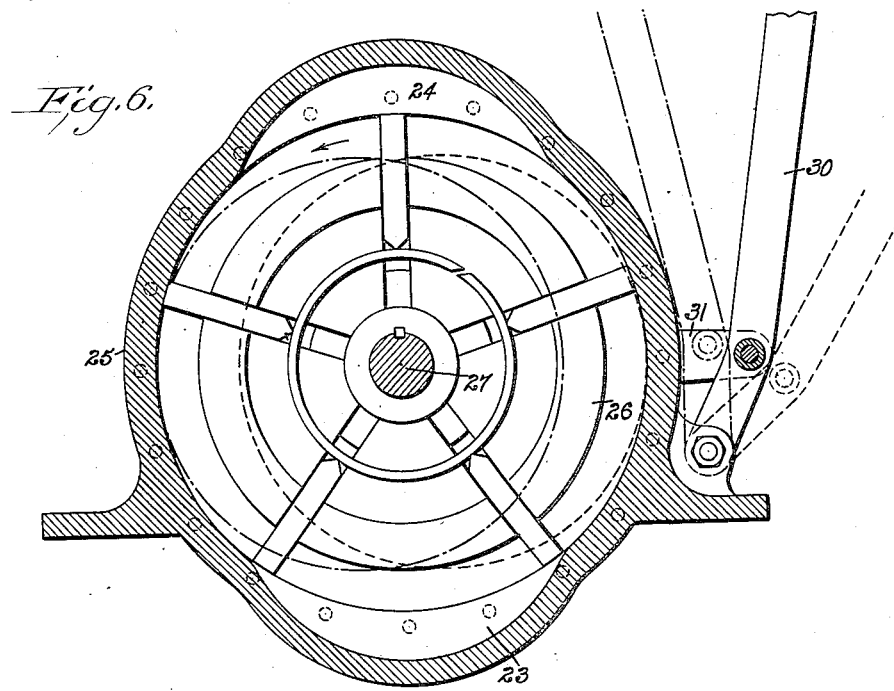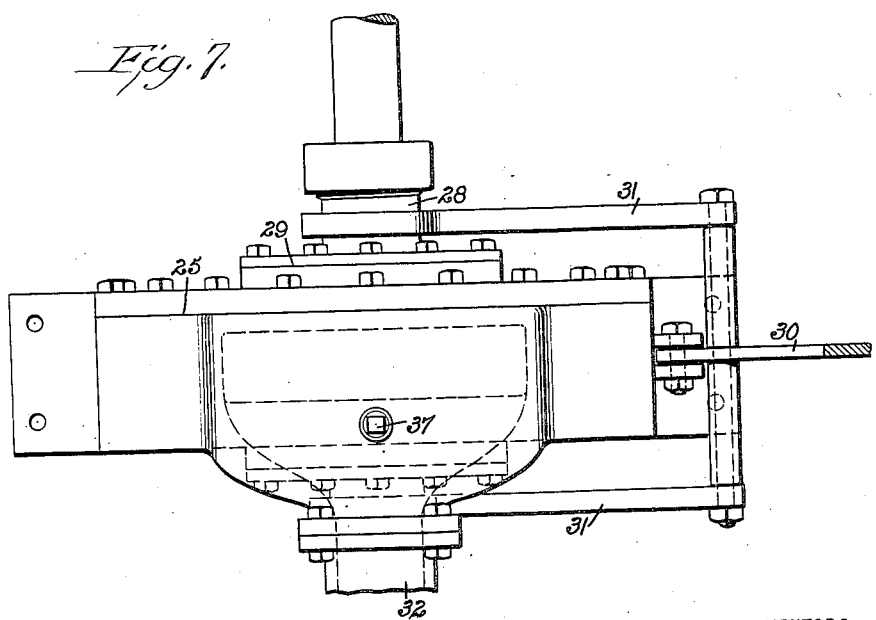

UNITED STATES PATENT OFFICE.

HENRY HANSEN AND JAMES A. MONTGOMERY, OF UKIAH, CALIFORNIA.

DIFFERENTIAL TRANSMISSION.

1,257,225.  Specification of Letters Patent.  Patented Feb. 19, 1918.

Application filed March 16, 1917. Serial No. 155,220.

*To all whom it may concern:*

Be it known that we, HENRY HANSEN and JAMES A. MONTGOMERY, citizens of the United States, and residents of Ukiah, in the county of Mendocino and State of California, have invented a new and Improved Differential Transmission, of which the following is a full, clear, and exact description.

Our invention relates to transmissions of the fluid type, particularly adaptable for use in connection with oil.

An object of the invention is to provide a simple and efficient power transmission whereby various speeds and reverse motion may be obtained.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Fig. 2 is a cross section through the motor on line 2—2, Fig. 1;

Fig. 3 is a plan view of the motor;

Fig. 4 is a perspective view of a runner blade;

Fig. 5 is a fragmentary elevation of the pump on line 5—5, Fig. 1:

Fig. 6 is a section through the pump on line 6—6, Fig. 1; and

Fig. 7 is a plan view of the pump.

Figure 1:
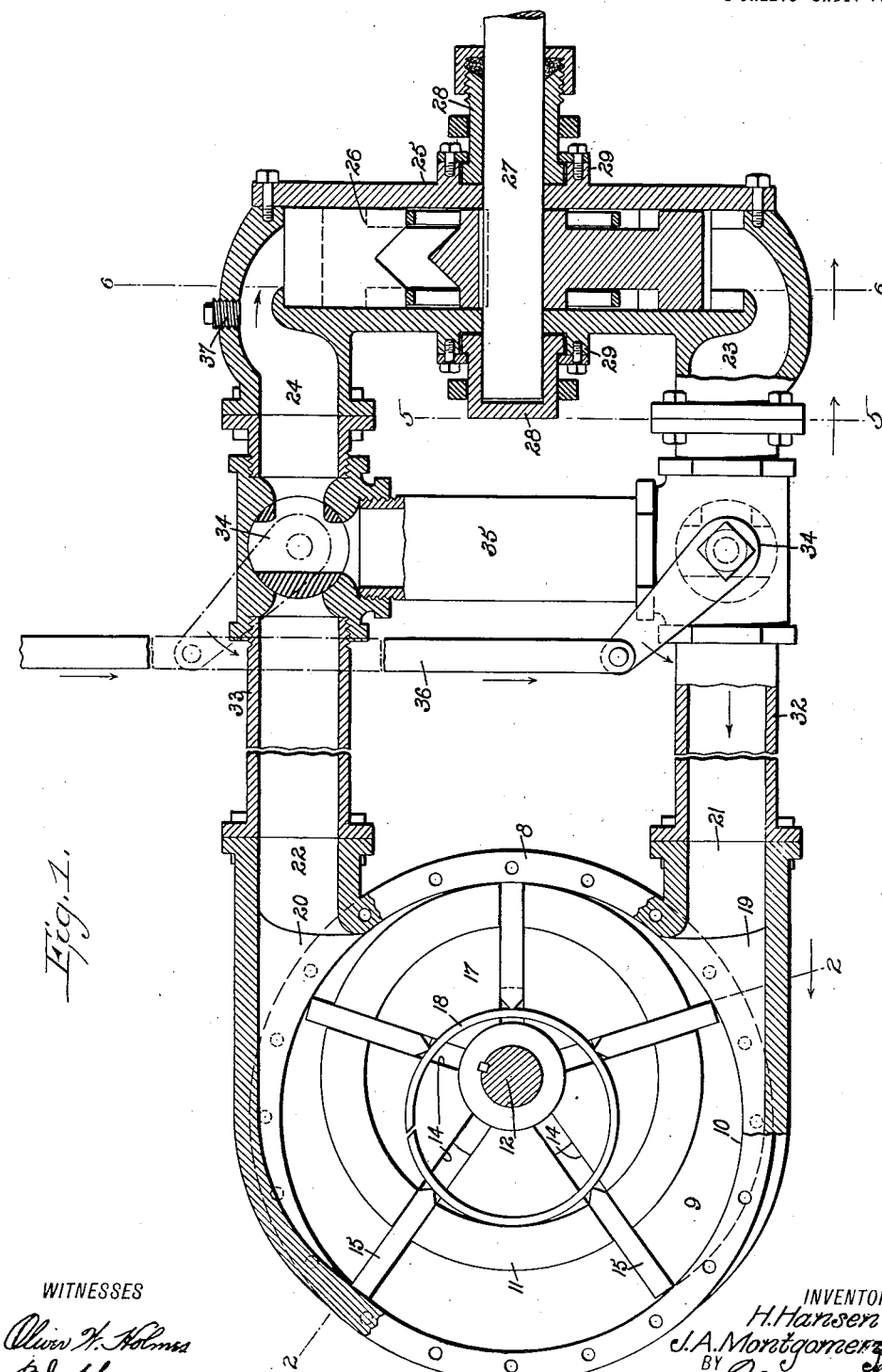
Figure 1 is a longitudinal section through the transmission, certain parts being shown in elevation to better illustrate the invention.

Referring to the drawings, 8 is a motor casing which is partitioned centrally across the axis thereof to provide independent cylindrical chambers 9 and 10 each accommodating a runner 11. A shaft 12 is provided for each of the runners, which may be the axles of a vehicle when the transmission is used in connection with a vehicle. Each of the chambers is closed by a corresponding head 13 which presents a bearing to the corresponding shaft 12 eccentric with the chamber. Each of the runners has a plurality of radial slots 14 engaged by blades 15. The inner edge of each blade is V-shaped in cross section and provided with a V-shaped notch 16 in the central part of the blade. Each of the runners 11 has an annular recess 17 on each side thereof for a corresponding split ring 18 which engages the inner edges of the blades and maintains the blades concentric with the recesses of the casing 8.

Each of the chambers has an inlet and an outlet channel or passage 19 and 20 respectively. The inlet passages of the chambers merge in a common inlet passage 21, and the outlet passages of the two chambers merge in a common outlet passage 22. The inlet and outlet passages 21 and 22 are connected to inlet and outlet passages 23 and 24 respectively of a pump stator 25 which incloses a rotor 26. The structure of the rotor is identical to the structure of the runners of the motor. The rotor 26 is keyed to a shaft 27, the bearings 28 of which are mounted to slide in boxes 29 provided on the sides of the stator. This provision permits the variation of the eccentricity of the rotor within the stator in a plane equidistant from the inlet and outlet. Due to this adjustment, the rotor may be so located as to prevent circulation between the inlet and the outlet or reverse the direction of flow. The shaft 27 is displaced through the medium of a lever 30 which is connected by links 31 to the bearings of the shaft.

The conduits 32 and 33 which join the inlets and outlets respectively of the pump and motor are each provided with a three-way valve 34. The valves are joined by a conduit 35 which forms a bypass between the conduits 32 and 33. The valves are operable simultaneously and in synchronism by a rod 36, whereby the quantity of fluid circulated through the pump and bypass may be varied.

Motion is imparted to the shaft 27 from any suitable prime mover. In accordance with the position of the rotor, a circulation of fluid will be set up in the system, the system being filled up through a plugged opening 37 provided in the stator of the pump. As shown in Fig. 6, the rotor is in neutral position, but by moving it to the left, as shown in dotted lines in said figure, fluid will be drawn through the port 24 and discharged through the port 23, thus forcing a circulation through the conduits. If the valves 34 are placed to establish communication between the pump and the rotor, the runners of the rotor will be set into rotation and, in consequence, motion imparted to the shafts 12 associated with the runners.

When the rotor is moved to the central position the pump becomes neutral; therefore there will be no circulation through the conduits. By bringing the rotor to the right of Fig. 6, as shown in dotted line in said figure, the flow of fluid will be reversed, in consequence reversing the rotation of the motors. The three-way valves 34, when set in the position shown in Fig. 1, will form a brake for the shafts 12. The braking action can be varied by varying the amount of opening between the rotors and the bypass.

We claim:

1. In a fluid transmission, a rotary pump comprising a stator, a rotor, said stator having an inlet and an outlet and elongated openings in the heads of the stator in a plane midway between the inlet and the outlet, a shaft for said rotor engaging the elongated openings, bearings for said shaft, boxes on the heads of the stator engaging the bearings, and means for moving said bearings in said boxes whereby the position of the rotor in the stator may be altered, substantially as and for the purpose set forth.

2. In a fluid transmission, a rotary pump comprising a stator, a rotor, said stator having an inlet and an outlet and elongated openings in the heads of the stator in a plane midway between the inlet and the outlet, a shaft for said rotor engaging the elongated openings, bearings for said shaft, boxes on the heads of the stator engaging the bearings, means for moving said bearings in said boxes whereby the position of the rotor in the stator may be altered, and a motor connected to the pump and operable thereby.

HENRY HANSEN.
JAMES A. MONTGOMERY.